US012634228B2

(12) United States Patent
Xiong et al.

(10) Patent No.: US 12,634,228 B2
(45) Date of Patent: May 19, 2026

(54) DETERMINISTIC FLOW FORWARDING METHOD AND APPARATUS, STORAGE MEDIUM AND ELECTRONIC APPARATUS

(71) Applicant: ZTE Corporation, Shenzhen (CN)

(72) Inventors: Quan Xiong, Shenzhen (CN); Haisheng Wu, Shenzhen (CN); Yao Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 290 days.

(21) Appl. No.: 18/571,950

(22) PCT Filed: Apr. 28, 2022

(86) PCT No.: PCT/CN2022/089968
§ 371 (c)(1),
(2) Date: Dec. 19, 2023

(87) PCT Pub. No.: WO2023/279818
PCT Pub. Date: Jan. 12, 2023

(65) Prior Publication Data
US 2024/0314065 A1 Sep. 19, 2024

(30) Foreign Application Priority Data
Jul. 8, 2021 (CN) .......................... 202110776088.6

(51) Int. Cl.
*H04L 45/00* (2022.01)
*H04L 45/12* (2022.01)
*H04L 45/121* (2022.01)
(52) U.S. Cl.
CPC .............. *H04L 45/34* (2013.01); *H04L 45/12* (2013.01); *H04L 45/121* (2013.01)

(58) Field of Classification Search
CPC ........ H04L 45/34; H04L 45/12; H04L 45/121
See application file for complete search history.

(56) References Cited

U.S. PATENT DOCUMENTS

2018/0152377 A1 5/2018 Wetterwald et al.
2021/0385150 A1* 12/2021 Shrivastava ............ H04L 45/34
(Continued)

FOREIGN PATENT DOCUMENTS

| CN | 110535782 | A | 12/2019 | |
| CN | 112511329 | A | 3/2021 | |
| CN | 113767597 | A * | 12/2021 | ........... H04L 47/125 |

OTHER PUBLICATIONS

International Search Report for corresponding application PCT/CN2022/089968 filed Apr. 28, 2022; Mail date Jul. 26, 2022.
(Continued)

*Primary Examiner* — Derrick V Rose
(74) *Attorney, Agent, or Firm* — CANTOR COLBURN LLP

(57) ABSTRACT

A deterministic flow forwarding method and apparatus, a storage medium and an electronic device are provided. The method includes: sending, by a controller, a Segment Routing (SR) policy carrying deterministic path information to an edge node of a network, wherein the SR Policy is used for instructing the edge node of the network to forward a deterministic flow according to the deterministic path information. By virtue of the above technical solution, the problem that a controller cannot implement distribution of a deterministic path by an SR Policy is solved.

10 Claims, 6 Drawing Sheets

Sending, by a controller, an SR Policy carrying deterministic path information to an edge node of a network, wherein the SR Policy is used for instructing the edge node of the network to forward a deterministic flow according to the deterministic path information

S202

(56) References Cited

U.S. PATENT DOCUMENTS

| | | | |
|---|---|---|---|
| 2022/0014297 A1* | 1/2022 | Bhatia | H04L 47/50 |
| 2022/0103463 A1* | 3/2022 | Margaria | H04L 45/124 |
| 2022/0150159 A1* | 5/2022 | Medagliani | H04L 41/0894 |
| 2022/0182315 A1* | 6/2022 | Geng | H04L 12/4641 |
| 2023/0040043 A1* | 2/2023 | Chen | H04L 69/04 |
| 2023/0336471 A1* | 10/2023 | Dhody | H04L 45/741 |
| 2024/0007399 A1* | 1/2024 | Zheng | H04L 45/50 |

OTHER PUBLICATIONS

Geng, Xuesong et al., "SRv6 for Deterministic Networking (DetNet) draft-geng-spring-srv6-for-detnet-01", IETF, Jul. 13, 2020, pp. 3-9.

* cited by examiner

Sending, by a controller, an SR Policy carrying deterministic path information to an edge node of a network, wherein the SR Policy is used for instructing the edge node of the network to forward a deterministic flow according to the deterministic path information    S202

Fig. 3

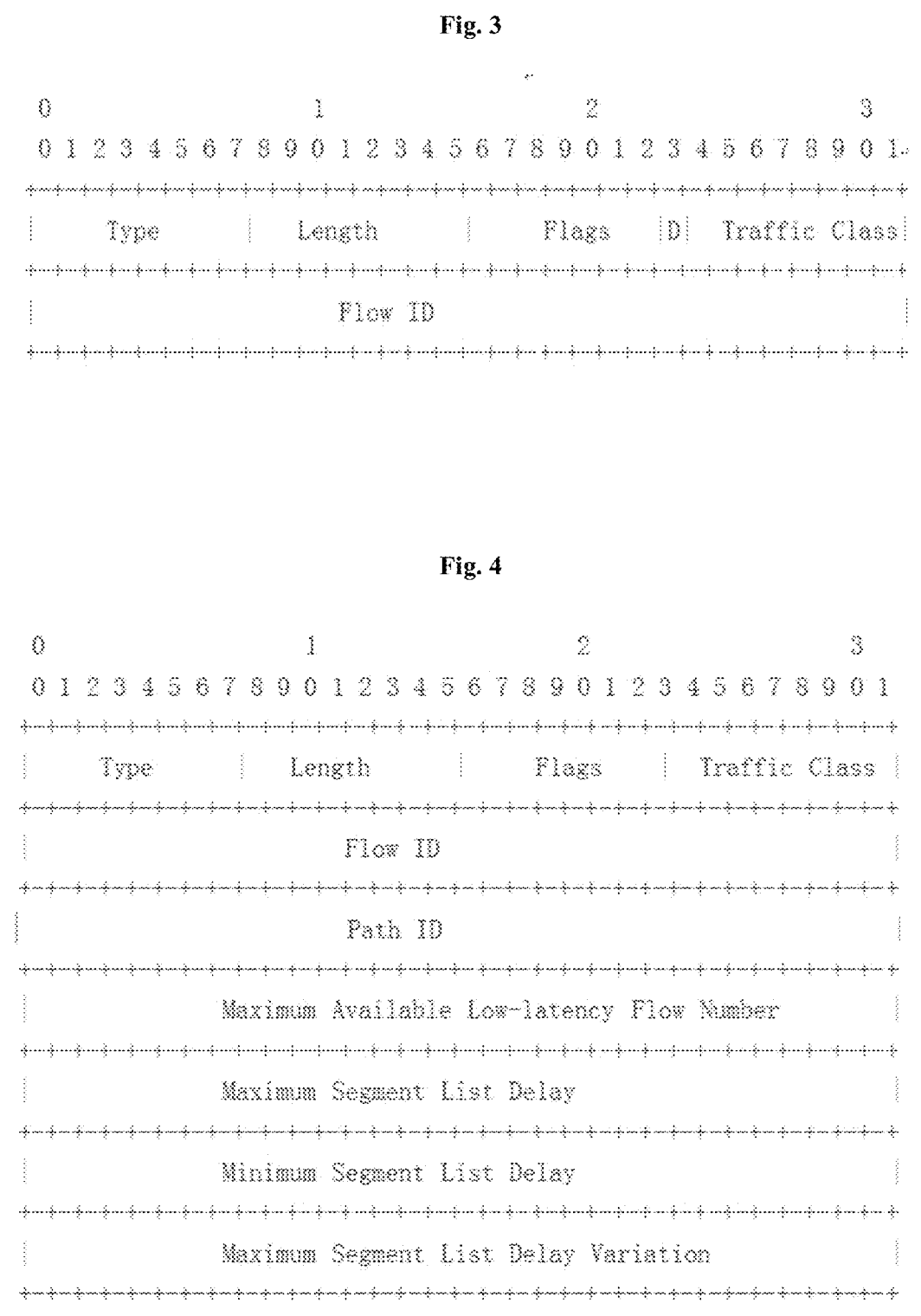

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type       |     Length      |      Flags      |D| Traffic Class|
+-+-+-+-+-+-+-+-+-+-+-+-+-+-+-+-+-+-+-+-+-+-+-+-+-+-+-+-+-+-+-+-+
|                            Flow ID                             |
+-+-+-+-+-+-+-+-+-+-+-+-+-+-+-+-+-+-+-+-+-+-+-+-+-+-+-+-+-+-+-+-+
```

Fig. 4

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type       |     Length      |      Flags      |  Traffic Class  |
+-+-+-+-+-+-+-+-+-+-+-+-+-+-+-+-+-+-+-+-+-+-+-+-+-+-+-+-+-+-+-+-+
|                            Flow ID                             |
+-+-+-+-+-+-+-+-+-+-+-+-+-+-+-+-+-+-+-+-+-+-+-+-+-+-+-+-+-+-+-+-+
|                            Path ID                             |
+-+-+-+-+-+-+-+-+-+-+-+-+-+-+-+-+-+-+-+-+-+-+-+-+-+-+-+-+-+-+-+-+
|           Maximum Available Low-latency Flow Number            |
+-+-+-+-+-+-+-+-+-+-+-+-+-+-+-+-+-+-+-+-+-+-+-+-+-+-+-+-+-+-+-+-+
|                   Maximum Segment List Delay                   |
+-+-+-+-+-+-+-+-+-+-+-+-+-+-+-+-+-+-+-+-+-+-+-+-+-+-+-+-+-+-+-+-+
|                   Minimum Segment List Delay                   |
+-+-+-+-+-+-+-+-+-+-+-+-+-+-+-+-+-+-+-+-+-+-+-+-+-+-+-+-+-+-+-+-+
|              Maximum Segment List Delay Variation              |
+-+-+-+-+-+-+-+-+-+-+-+-+-+-+-+-+-+-+-+-+-+-+-+-+-+-+-+-+-+-+-+-+
```

Fig. 5

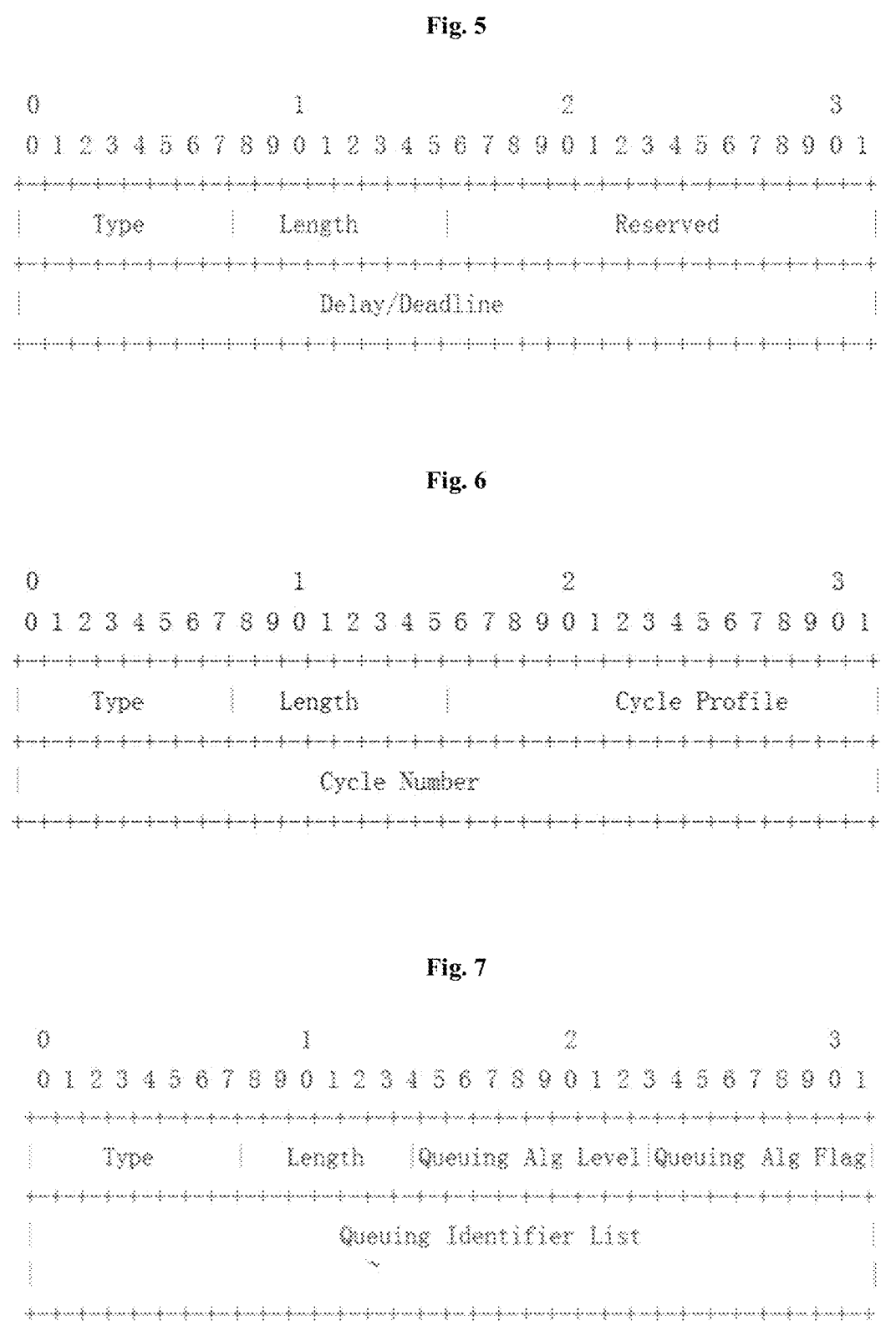

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type       |     Length      |           Reserved        |
+-+-+-+-+-+-+-+-+-+-+-+-+-+-+-+-+-+-+-+-+-+-+-+-+-+-+-+-+-+-+-+-+
|                         Delay/Deadline                        |
+-+-+-+-+-+-+-+-+-+-+-+-+-+-+-+-+-+-+-+-+-+-+-+-+-+-+-+-+-+-+-+-+
```

Fig. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type       |     Length      |         Cycle Profile     |
+-+-+-+-+-+-+-+-+-+-+-+-+-+-+-+-+-+-+-+-+-+-+-+-+-+-+-+-+-+-+-+-+
|                          Cycle Number                         |
+-+-+-+-+-+-+-+-+-+-+-+-+-+-+-+-+-+-+-+-+-+-+-+-+-+-+-+-+-+-+-+-+
```

Fig. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |   Length    |Queuing Alg Level|Queuing Alg Flag|
+-+-+-+-+-+-+-+-+-+-+-+-+-+-+-+-+-+-+-+-+-+-+-+-+-+-+-+-+-+-+-+-+
|                    Queuing Identifier List                    |
|                              ~                                |
+-+-+-+-+-+-+-+-+-+-+-+-+-+-+-+-+-+-+-+-+-+-+-+-+-+-+-+-+-+-+-+-+
```

Fig. 8

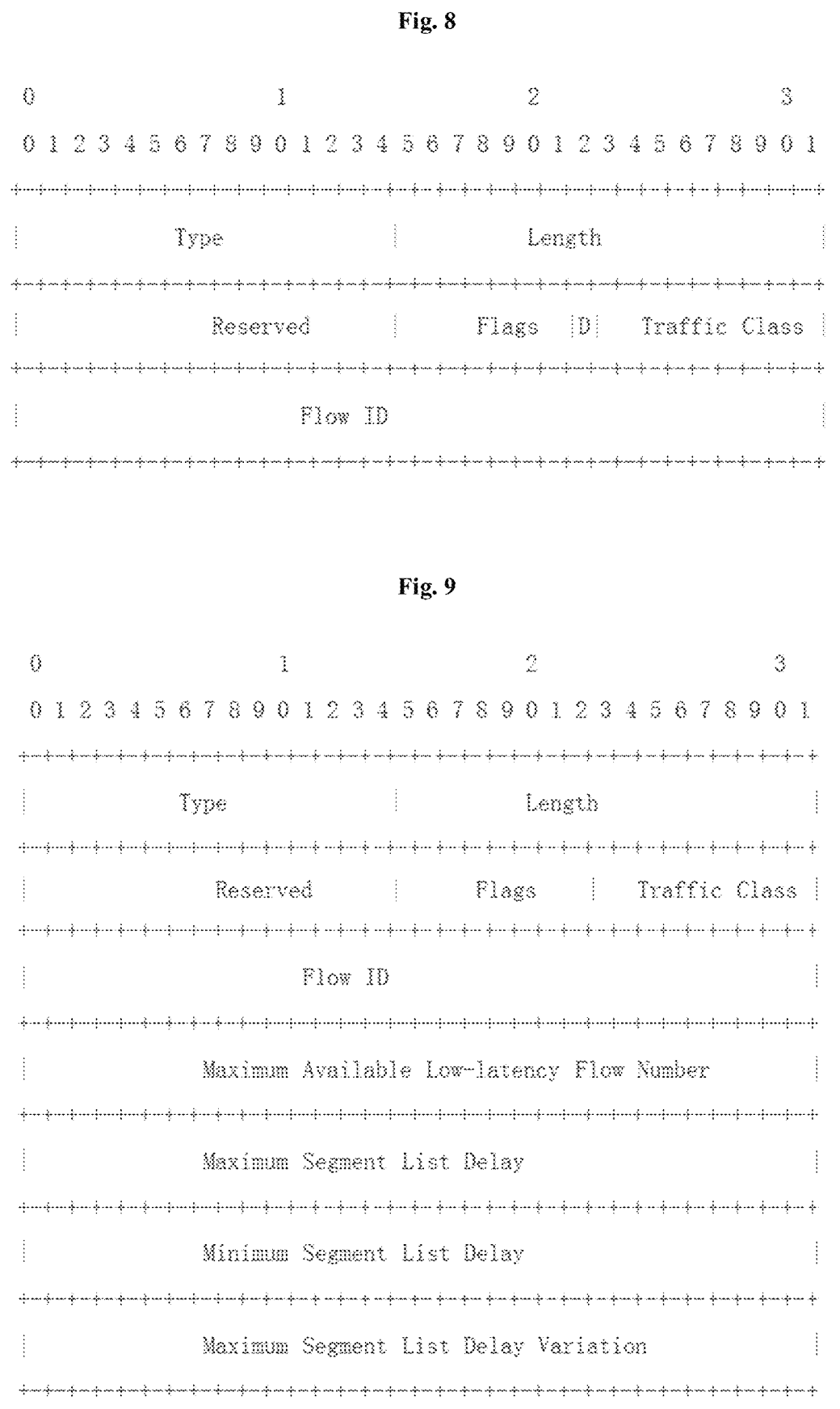

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type             |             Length              |
+-+-+-+-+-+-+-+-+-+-+-+-+-+-+-+-+-+-+-+-+-+-+-+-+-+-+-+-+-+-+-+-+
|          Reserved           |     Flags  |D|  Traffic Class   |
+-+-+-+-+-+-+-+-+-+-+-+-+-+-+-+-+-+-+-+-+-+-+-+-+-+-+-+-+-+-+-+-+
|                           Flow ID                             |
+-+-+-+-+-+-+-+-+-+-+-+-+-+-+-+-+-+-+-+-+-+-+-+-+-+-+-+-+-+-+-+-+
```

Fig. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type             |             Length              |
+-+-+-+-+-+-+-+-+-+-+-+-+-+-+-+-+-+-+-+-+-+-+-+-+-+-+-+-+-+-+-+-+
|          Reserved           |    Flags    |  Traffic Class    |
+-+-+-+-+-+-+-+-+-+-+-+-+-+-+-+-+-+-+-+-+-+-+-+-+-+-+-+-+-+-+-+-+
|                           Flow ID                             |
+-+-+-+-+-+-+-+-+-+-+-+-+-+-+-+-+-+-+-+-+-+-+-+-+-+-+-+-+-+-+-+-+
|           Maximum Available Low-latency Flow Number           |
+-+-+-+-+-+-+-+-+-+-+-+-+-+-+-+-+-+-+-+-+-+-+-+-+-+-+-+-+-+-+-+-+
|                  Maximum Segment List Delay                   |
+-+-+-+-+-+-+-+-+-+-+-+-+-+-+-+-+-+-+-+-+-+-+-+-+-+-+-+-+-+-+-+-+
|                  Minimum Segment List Delay                   |
+-+-+-+-+-+-+-+-+-+-+-+-+-+-+-+-+-+-+-+-+-+-+-+-+-+-+-+-+-+-+-+-+
|             Maximum Segment List Delay Variation             |
+-+-+-+-+-+-+-+-+-+-+-+-+-+-+-+-+-+-+-+-+-+-+-+-+-+-+-+-+-+-+-+-+
```

Fig. 10

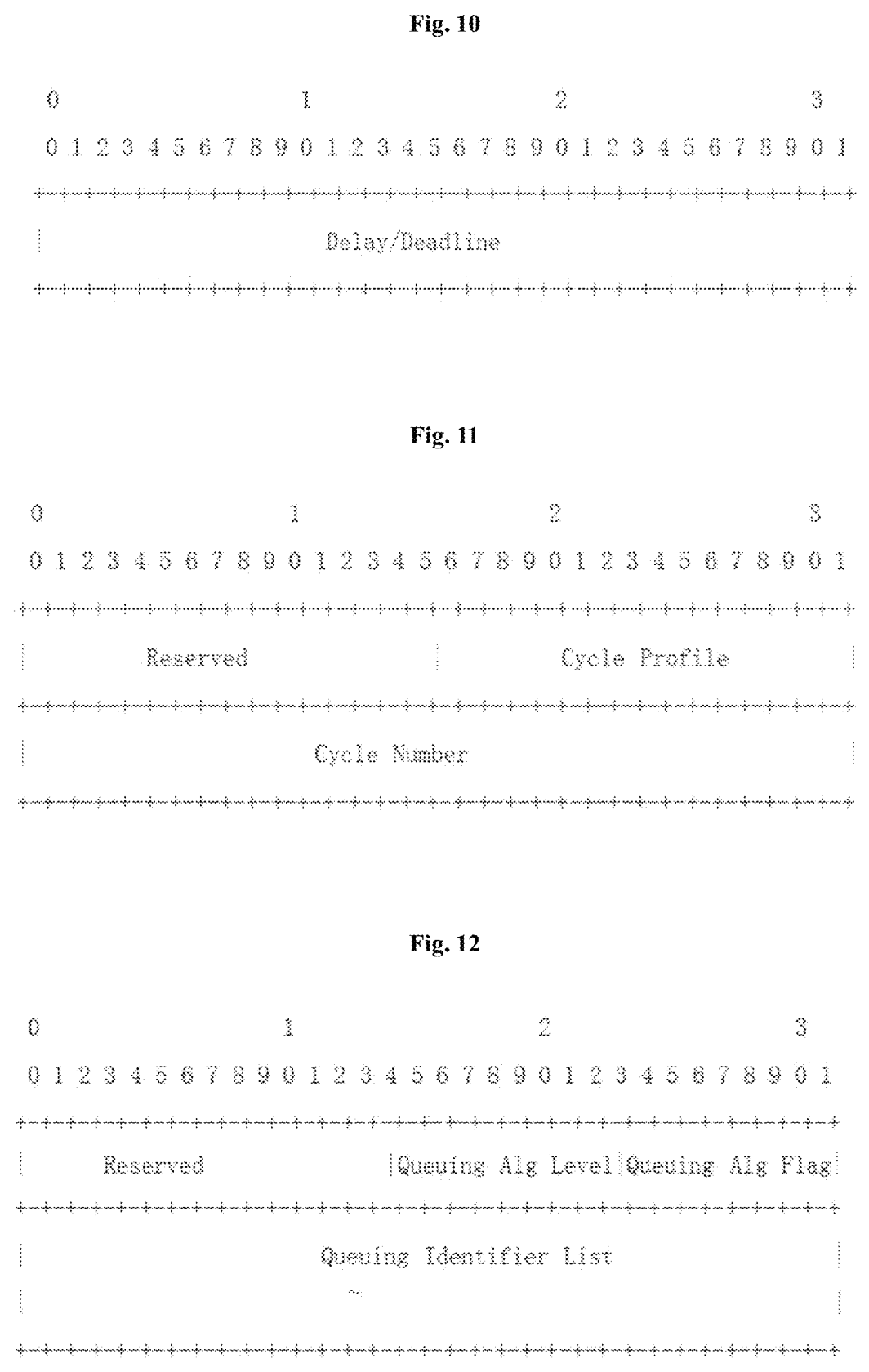

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                        Delay/Deadline                         |
+-+-+-+-+-+-+-+-+-+-+-+-+-+-+-+-+-+-+-+-+-+-+-+-+-+-+-+-+-+-+-+-+
```

Fig. 11

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Reserved            |         Cycle Profile         |
+-+-+-+-+-+-+-+-+-+-+-+-+-+-+-+-+-+-+-+-+-+-+-+-+-+-+-+-+-+-+-+-+
|                         Cycle Number                          |
+-+-+-+-+-+-+-+-+-+-+-+-+-+-+-+-+-+-+-+-+-+-+-+-+-+-+-+-+-+-+-+-+
```

Fig. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|           Reserved           |Queuing Alg Level|Queuing Alg Flag|
+-+-+-+-+-+-+-+-+-+-+-+-+-+-+-+-+-+-+-+-+-+-+-+-+-+-+-+-+-+-+-+-+
|                     Queuing Identifier List                   |
|                              ~                                |
+-+-+-+-+-+-+-+-+-+-+-+-+-+-+-+-+-+-+-+-+-+-+-+-+-+-+-+-+-+-+-+-+
```

Fig. 13
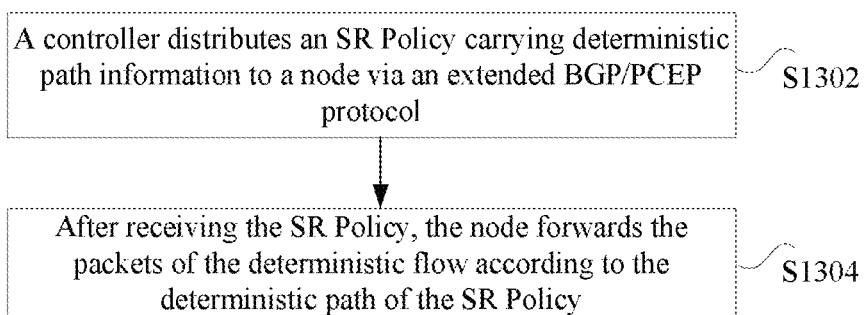
Fig. 14
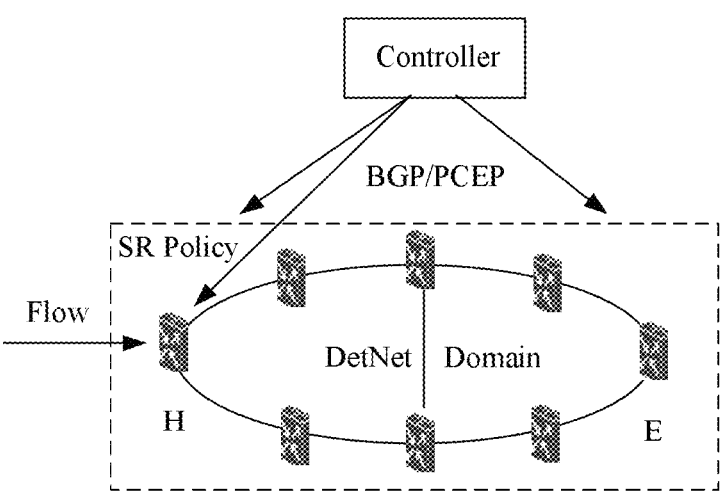
Fig. 15
Sending module  152

DETERMINISTIC FLOW FORWARDING METHOD AND APPARATUS, STORAGE MEDIUM AND ELECTRONIC APPARATUS

The present disclosure is a National Stage Filing of the PCT International Application No. PCT/CN2022/089968 filed on Apr. 28, 2022, which claims priority to Chinese Patent Application No. 202110776088.6, filed with the China National Intellectual Property Administration on Jul. 8, 2021 and entitled "DETERMINISTIC FLOW FORWARDING METHOD AND APPARATUS, STORAGE MEDIUM AND ELECTRONIC DEVICE", which is incorporated herein by reference in its entirety.

TECHNICAL FIELD

The present disclosure relates to the field of communications, and in particular to a deterministic flow forwarding method and apparatus, a storage medium and an electronic device.

BACKGROUND

In order to satisfy requirements of services such as deterministic services and implement a deterministic technology in a Layer 3 (L3) layer, the Internet Engineering Task Force (IETF) standardization organizations propose a Deterministic Networking (DetNet). An RFC8655 defines a technical architecture related to DetNet to provide a deterministic service for a layer 2 (L2) bridge and an L3 routing network, and the corresponding Quality of Service (QoS) requirement includes a deterministic time delay upper limit, a low packet loss rate, a reduced jitter and a high reliability, etc. A deterministic network technology is a technology for providing a network that provides deterministic services for deterministic service flows. The deterministic network technology does not limit a specific topology and connectivity, and may reserve network resources through a network management system, an application controller, and the like during the implementation of the deterministic network. The deterministic network employs resource reservation, explicit routing, and service protection to provide the required QoS. The explicit routing is employed to meet a deterministic path requirement, which means that a network path of a deterministic service flow needs to be selected in advance, so as to ensure stability of the route at least during service residence. Routing in a deterministic network employs a deterministic path technology, which ensures that a routing path does not change with real-time change of a network topology. This deterministic path technology ensures that a transmission path for a deterministic flow is relatively fixed, which provides a basic guarantee for a resource reservation technology. In addition, the fixed transmission path enables accurate calculation of a delay, thereby providing an important technical support for guaranteeing a limited delay and jitter. Moreover, resource reservation is used for satisfying a resource deterministic requirement, and relates to operations such as resource allocation and reservation, the resources including buffer, link bandwidth, delay queue resources, etc. Both deterministic path and resource reservation rely on centralized control and scheduling of resources by a controller.

According to the definition of IETF RFC8655, the DetNet function is divided into a DetNet service sub-layer and a DetNet forwarding sub-layer. The service sub-layer completes service protection, such as message duplication elimination and sequencing. The forwarding sub-layer completes bottom layer forwarding of the DetNet flow, provides functions such as explicit routing and resource reservation, and may rely on a Segment Routing (SR) technology. The SR technology defined in IETF RFC8402 is a forwarding technology based on source routing. A headend node can select a path and steer a data packet in a network along the path. The SR technology is implemented by inserting an ordered List of Segments (Segment List) in a data packet header so as to instruct nodes along the path to process and forward the data packet. It is proposed in draft-ietf-spring-segment-routing-policy-13 that a headend node may steer a data flow into a Segment Routing Policy (SR Policy). A controller may configure the SR Policy on a node, so as to instantiate an ordered Segment List used for forwarding flows satisfying an associated SLA. The SR Policy may be uniquely identified by a triple <headend, color, endpoint>, and each SR Policy may include one or more Candidate Paths. Each Candidate Path may be identified by a triple <Protocol-Origin, originator, discriminator>, and one Candidate Path may be associated with a group of Segment Lists. A Composite Candidate Path may include a set of SR Policies. It is proposed in draft-ietf-idr-segment-routing-te-policy-13 to distribute a Candidate Path of an SR Policy by using Border Gateway Protocol (BGP). It is proposed in draft-ietf-pce-segment-routing-policy-cp-05 and draft-ietf-pce-multipath-00 to extend a Path Computation Element (PCE) Communication Protocol (PCEP) to distribute an association group of a Candidate Path.

Aiming at the problem in the related art that a controller cannot implement distribution of a deterministic path by an SR Policy, no effective solution has been proposed at present.

Therefore, there is a need for improvements in the related art to overcome the deficiencies in the related art.

SUMMARY

Embodiments of the present disclosure provide a deterministic flow forwarding method and apparatus, a storage medium and an electronic device, which may at least solve the problem that a controller cannot implement distribution of a deterministic path by an SR Policy.

According to an aspect of the embodiments of the present disclosure, a deterministic flow forwarding method is provided, including: sending, by a controller, a Segment Routing (SR) Policy carrying deterministic path information to an edge node of a network, wherein the SR Policy is used for instructing the edge node of the network to forward a deterministic flow according to the deterministic path information.

According to another aspect of the embodiments of the present disclosure, a deterministic flow forwarding apparatus is also provided, which is applied to a controller and includes: a sending module, configured to send a Segment Routing (SR) Policy carrying deterministic path information to an edge node of a network, wherein the SR Policy is used for instructing the edge node of the network to forward a deterministic flow according to the deterministic path information.

According to another aspect of the embodiments of the present disclosure, a computer-readable storage medium is further provided. The computer-readable storage medium stores a computer program, and the computer program, when running on a processor, causes the processor to execute the above deterministic flow forwarding method.

According to another aspect of the embodiments of the present disclosure, an electronic device is also provided, including a memory, a processor and a computer program stored in the memory and operable on the processor, wherein the processor runs the computer program to execute the described deterministic flow forwarding method.

By virtue of the embodiments of the present disclosure, a controller sends an SR Policy carrying deterministic path information to an edge node of a network, wherein the SR Policy is used for instructing the edge node of the network to forward a deterministic flow according to the deterministic path information. By virtue of the technical solution, the problem that a controller cannot implement distribution of a deterministic path by an SR Policy is solved. In addition, the controller may implement deterministic path selection of a DetNet via the SR Policy, and may steer a deterministic flow into an SR Policy forwarding path at an edge node of the DetNet.

BRIEF DESCRIPTION OF THE DRAWINGS

Drawings, provided for further understanding of the embodiments of the present disclosure and forming a part of the description, are used to explain the present disclosure together with exemplary embodiments of the present disclosure rather than to limit the present disclosure. In the drawings:

FIG. 3 is a diagram of the format of a Policy Candidate Path Flow Sub-TLV of a deterministic flow forwarding method according to the embodiments of the present disclosure;

FIG. 4 is a diagram of the format of a Low Latency Sub-TLV of a deterministic flow forwarding method according to the embodiments of the present disclosure;

FIG. 5 is a diagram of the format of a Delay Information sub-sub-TLV of a deterministic flow forwarding method according to the embodiments of the present disclosure;

FIG. 6 is a diagram of the format of a Cycle Information sub-sub-TLV of a method for forwarding a certain flow according to the embodiments of the present disclosure;

FIG. 7 is a diagram of the format of a Queuing Information sub-sub-TLV of a deterministic flow forwarding method according to the embodiments of the present disclosure;

FIG. 8 is a diagram of the format of a Policy Candidate Path Flow TLV of a deterministic flow forwarding method according to the embodiments of the present disclosure;

FIG. 9 is a diagram of the format of a Multipath Low Latency Sub-TLV of a deterministic flow forwarding method according to the embodiments of the present disclosure;

FIG. 10 is a diagram of the format of Delay Information of a deterministic flow forwarding method according to the embodiments of the present disclosure;

FIG. 11 is a diagram of the format of Cycle Information of a deterministic flow forwarding method according to the embodiments of the present disclosure;

FIG. 12 is a diagram of the format of Queuing Information of a deterministic flow forwarding method according to the embodiments of the present disclosure;

FIG. 13 is a second flowchart of a deterministic flow forwarding method according to the embodiments of the present disclosure;

FIG. 14 is a diagram of an SR Policy based deterministic network of a deterministic flow forwarding method according to the embodiments of the present disclosure; and FIG. 15 is a structural block diagram of a deterministic flow forwarding apparatus according to the embodiments of the present disclosure.

DETAILED DESCRIPTION

Figures 1, 2:
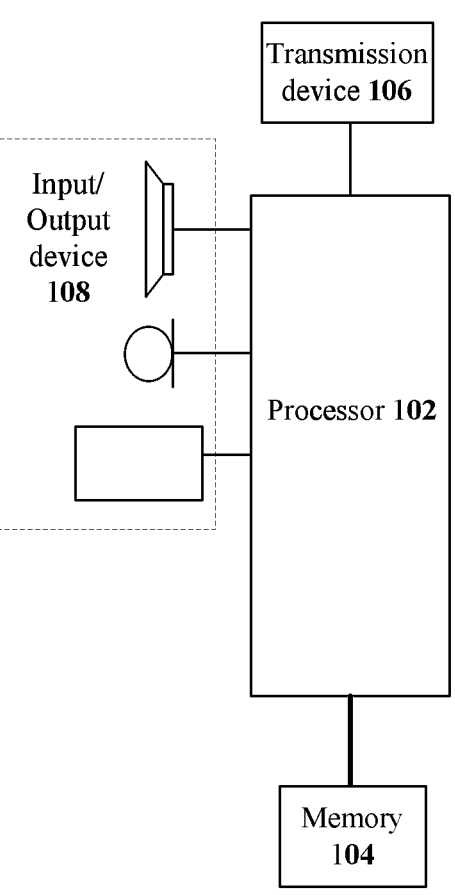
FIG. 1 is a block diagram showing the hardware structure of a computer terminal for implementing a deterministic flow forwarding method according to the embodiments of the present disclosure.
FIG. 2 is a first flowchart of a deterministic flow forwarding method according to the embodiments of the present disclosure.

In order to make those having ordinary skill in the art better understand the solutions of the present disclosure, the technical solutions of the embodiments of the present disclosure will be clearly and completely described below with reference to the accompanying drawings related to the embodiments of the present disclosure. Apparently, the described embodiments are merely a part rather than all of the embodiments of the present disclosure. All other embodiments obtained by those having ordinary skill in the art based on the embodiments of the present disclosure without creative efforts shall belong to the scope of protection of the present disclosure.

It should be noted that, terms such as "first" and "second" in the description, claims, and accompanying drawings of the present disclosure are used to distinguish similar objects, but are not necessarily used to describe a specific sequence or order. It should be understood that the data so used may be interchanged where appropriate so that the embodiments of the present disclosure described herein may be implemented in sequences other than those illustrated or described herein. In addition, the terms "include" and "have", and any variations thereof, are intended to cover a non-exclusive inclusion, for example, a process, method, system, product, or apparatus that includes a series of operations or units is not necessarily limited to those operations or units that are expressly listed, but may include other operations or units that are not expressly listed or inherent to such process, method, product, or apparatus.

The method embodiments provided in the embodiments of the present disclosure may be executed in a computer terminal or a similar computing apparatus. Taking the implementation on the computer terminal as an example, FIG. 1 is a block diagram showing the hardware structure of a computer terminal for implementing a deterministic flow forwarding method according to the embodiments of the present disclosure. As shown in FIG. 1, the computer terminal may include one or more (only one is shown in FIG. 1) processors 102 (the processor 102 may include, but is not limited to, a Microprocessor Unit (MPU) or a Programmable Logic Device (PLD)) and a memory 104 for storing data. In an exemplary embodiment, the computer terminal may further include a transmission device 106 for communication function and an input/output device 108. A person having ordinary skill in the art may understand that the structure shown in FIG. 1 is merely exemplary, which does not limit the structure of the foregoing computer terminal. For example, the computer terminal may include more or fewer components than shown in FIG. 1, or have equivalent functions than those shown in FIG. 1, or have a different configuration with more functions than those shown in FIG. 1.

The memory 104 may be configured to store a computer program, for example, a software program and a module of application software, such as a computer program corresponding to the deterministic flow forwarding method in the embodiments of the present disclosure. The processor 102 runs the computer program stored in the memory 104, so as to execute various function applications and data processing, that is, to implement the foregoing method. The memory 104 may include high-speed random access memory, and may also include non-volatile memory, such as one or more magnetic storage devices, flash memory, or other non-volatile solid-state memory. In some examples, the memory 104 may further include a memory remotely located with respect to the processor 102, which may be connected to a computer terminal over a network. Examples of such network include, but are not limited to, the Internet, an intranet, a local area network, a mobile communication network, and combinations thereof.

The transmission device 106 is configured to receive or transmit data via a network. Specific examples of the described network may include a wireless network provided by a communication provider of the computer terminal. In an example, the transmission device 106 may include a Network Interface Controller (NIC) that may be coupled to other network devices via a base station to communicate with the Internet. In an example, the transmission device 106 may be a Radio Frequency (RF) module for communicating wirelessly with the Internet.

The embodiments of the present disclosure provide a deterministic flow forwarding method. FIG. 2 is a first flowchart of a deterministic flow forwarding method according to the embodiments of the present disclosure. The flow includes the following operation S202.

In operation S202, a controller sends an SR Policy carrying deterministic path information to an edge node of a network, wherein the SR Policy is used for instructing the edge node of the network to forward a deterministic flow according to the deterministic path information.

By means of the operations, a controller sends an SR Policy carrying deterministic path information to an edge node of a network, wherein the SR Policy is used for instructing the edge node of the network to forward a deterministic flow according to the deterministic path information. By virtue of the technical solution, the problem that a controller cannot implement distribution of a deterministic path by an SR Policy is solved. In addition, the controller may implement deterministic path selection of a DetNet via the SR Policy, and may steer a deterministic flow into an SR Policy forwarding path at an edge node of the DetNet.

In some exemplary embodiments, the operation that the controller send the SR Policy carrying the deterministic path information to the edge node of the network includes at least one of: distributing, by the controller, the SR Policy via Path Computation Element (PCE) Communication Protocol (PCEP), wherein the controller is a Path Computation Element (PCE); and distributing, by the controller, the SR Policy via Border Gateway Protocol (BGP).

That is to say, in order to satisfy the requirements of path determination and resource reservation in the deterministic network, the embodiments of the present disclosure propose a method for distributing the deterministic path of the SR Policy by extending the BGP/PCEP protocol. In some exemplary implementations, a controller distributes an SR Policy carrying deterministic path information to an edge node of a DetNet via a BGP/PCEP protocol, thereby providing functions of resource reservation and path determination for a DetNet flow, so that the edge node of the DetNet, after receiving a packet, forwards the deterministic flow according to the deterministic path distributed by the SR Policy.

In some exemplary embodiments, the controller distributes the SR Policy via the BGP protocol in the following manner: the controller distributes a BGP UPDATE message that carries the deterministic path information to the edge node of the network.

That is to say, when the deterministic path of the SR Policy is distributed via the BGP protocol, the SR Policy distributed by the BGP UPDATE message carries the deterministic path information.

The controller may carry the deterministic path information in the BGP UPDATE message in the following manners.

(1) A Policy Candidate Path Flow Sub-TLV is extended in SR Policy Sub-TLVs to carry the deterministic path information corresponding to a Candidate Path, wherein the Policy Candidate Path Flow Sub-TLV includes: Type, Length, Flags, Traffic Class, and Flow ID.

It should be noted that a D bit in the Flags may be set to indicate that paths in all Segment Lists under the Candidate Path are disjoint paths.

That is to say, it is proposed in the embodiments of the present disclosure to extend a Policy Candidate Path Flow Sub-TLV in the SR Policy Sub-TLVs to carry the deterministic path information related to a Candidate Path. FIG. 3 is a diagram of the format of a Policy Candidate Path Flow Sub-TLV of a deterministic flow forwarding method according to the embodiments of the present disclosure, wherein:

Type: 8 bits, used for indicating the type of the sub-TLV.

Length: 8 bits, used for indicating the length of the sub-TLV.

Flags: 8 bits, used for indicating deterministic related features of the Candidate Path. The value of the D bit may be set to indicate that paths in all Segment Lists under the Candidate Path are disjoint paths, and may be selected as duplicate elimination paths in the deterministic network.

Traffic Class: 8 bits, used for indicating a traffic scheduling priority of the Candidate Path, and when steering a deterministic flow into an SR Policy, the Traffic Class may be associated according to a priority field (a DSCP in an IP header, or an TC in an MPLS header) carried in a packet header, so that a Candidate Path meeting a delay requirement may be selected.

Flow ID: 32 bits, used for uniquely identifying a deterministic flow, which enables to provide per-flow traffic scheduling in a deterministic network, for example, when a deterministic flow is aggregated, the traffic is aggregated to a flow identified by the Flow ID.

(2) A Low Latency Sub-TLV is extended in Segment List Sub-TLVs to carry the deterministic path information corresponding to the Segment List, wherein the Low Latency Sub-TLV includes: Type, Length, Flags, Traffic Class, Flow ID, Path ID, Maximum Available Low-latency Flow Number, Maximum Segment List Delay, Minimum Segment List Delay, and Maximum Segment List Delay Variation.

That is to say, it is proposed in the embodiments of the present disclosure to extend the Low Latency Sub-TLV in the Segment List Sub-TLVs to carry the deterministic path information related to the Segment List. FIG. 4 is a diagram of the format of a Low Latency Sub-TLV of a deterministic flow forwarding method according to the embodiments of the present disclosure, wherein:

Type: 8 bits, used for indicating the type of the sub-TLV.

Length: 8 bits, used for indicating the length of the sub-TLV.

Flags: 8 bits, used for indicating features of the Segment List.

Traffic Class: 8 bits, used for indicating a traffic scheduling priority of the Segment List, and when steering a deterministic flow into an SR Policy, the Traffic Class may be associated according to a priority field (a DSCP in an IP header, or an TC in an MPLS header) carried in a packet header, so that a Segment List meeting a delay requirement may be selected.

Flow ID: 32 bits, used for uniquely identifying a deterministic flow, which enables to provide per-flow traffic scheduling in a deterministic network, for example, when separating a deterministic flow, the traffic is separated into a flow identified by the Flow ID and a path of the flow.

Path ID: 32 bits, used for uniquely identifying a deterministic path. A deterministic path may be selected in a deterministic network based on the Path ID, per-class traffic scheduling may be provided, and the path may also be associated according to a Path ID carried in a packet in the deterministic flow.

Maximum Available Low-latency Flow Number: 32 bits, used for indicating the maximum number of deterministic flows that can be steered when the Segment List provides low latency assurance.

Maximum Segment List Delay: used for indicating the maximum end-to-end delay of the Segment List.

Minimum Segment List Delay: used for indicating the minimum end-to-end delay of the Segment List.

Maximum Segment List Delay Variation: used for indicating the maximum end-to-end delay jitter of the Segment List.

(3) Delay Information sub-sub-TLV, Cycle Information sub-sub-TLV and Queue Information sub-sub-TLV are extended in Segment Sub-TLVs to carry deterministic path delay information, cycle information and queue information corresponding to the segment, wherein the deterministic path delay information includes: Type, Length, Reserved, Delay or Deadline; and the cycle information includes Type, Length, Cycle Profile and Cycle Number.

That is to say, it is proposed in the embodiments of the present disclosure to extend Delay Information sub-sub-TLV, Cycle Information sub-sub-TLV and Queue Information sub-sub-TLV in Segment Sub-TLVs to carry deterministic path delay, cycle sequence and queue information related to Segment. FIG. 5 is a diagram of the format of a Delay Information sub-sub-TLV of a deterministic flow forwarding method according to the embodiments of the present disclosure, wherein:

Type: 8 bits, used for indicating the type of the sub-sub-TLV.

Length: 8 bits, used for indicating the length of the sub-sub-TLV.

Reserved: 16 bits, reserved.

Delay/Deadline: 32 bits, used for indicating a time delay or dwell time for a node that the deterministic path passes through to process a packet. The sub-sub-TLV is placed behind the Segment Sub-TLV, and the types of the delays differ according to different Segment types, for example, the delay may correspond to node delays or interface delay information.

FIG. 6 is a diagram of the format of a Cycle Information sub-sub-TLV of a method for forwarding a certain flow according to the embodiments of the present disclosure, wherein:

Type: 8 bits, used for indicating the type of the sub-sub-TLV.

Length: 8 bits, used for indicating the length of the sub-sub-TLV.

Cycle Profile: 16 bits, used for indicating a profile of the cycle sequence.

Cycle Number: 32 bits, used for indicating a cycle sequence number or a time slot of a node that the deterministic path passes through.

Further, the queue information includes: Type, Length, Queuing Algorithm (Alg) Level, Queuing Alg Flag, Queuing Identifier List.

FIG. 7 is a diagram of the format of a Queuing Information sub-sub-TLV of a deterministic flow forwarding method according to the embodiments of the present disclosure, wherein:

Type: 8 bits, used for indicating the type of the sub-sub-TLV.

Length: 8 bits, used for indicating the length of the sub-sub-TLV.

Queuing Alg Level: 8 bits, used for indicating a queuing algorithm level for a node that a deterministic path passes through to process a packet, wherein the queuing algorithm level is used for achieving functions such as queue multi-level scheduling.

Queuing Alg Flag: 8 bits, used for indicating a queuing algorithm type for a node that the deterministic path passes through to process a packet, wherein the queuing algorithm type includes, but not limited to, queuing algorithms such as Time Aware Shaping (TAS), Credit Based Shaper (CBS), Cyclic Queuing and Forwarding (CQF), and Asynchronous Traffic Shaping (ATS).

Queuing Identifier List: having a variable length, and used for identifying a group of queues for a node that the deterministic path passes through to process a packet.

In conclusion, the coding format of the SR Policy of the deterministic path in the BGP UPDATE message is as follows:

```
SR Policy SAFI NLRI: <Distinguisher, Policy-Color, Endpoint>
    Attributes:
        Tunnel Encaps Attribute (23)
            Tunnel Type: SR Policy
                Binding SID
                SRv6 Binding SID
                Preference
                Priority
                Policy Name
                Policy Candidate Path Name
                Policy Candidate Path Flow (New)
                Explicit NULL Label Policy (ENLP)
                Segment List-1
                    Weight
                    Low Latency (New)
                    Segment
                    Delay Information (New)
                    Cycle Information (New)
            Queue Information (New)
                    Segment
            Delay Information (New)
                    Cycle Information (New)
            Queue Information (New)
                    ...
                    Path Segment
            Segment List-2
                    ...
```

In an exemplary embodiment, the controller distributes the SR Policy via a PCEP protocol in the following manner: a PCEP PCInit or PCUpd message that carries the deterministic path information is distributed to the edge node of the network.

That is to say, when the deterministic path of the SR Policy is distributed via the PCEP protocol, it is proposed in the embodiments of the present disclosure that the SR Policy distributed via the PCEP PCUpd/PCinit message carries the deterministic path information.

It should be noted that the controller may carry the deterministic path information in the PCEP PCInit or PCUpd message in the following manners.

(1) A policy Candidate Path Flow TLV is extended in an SR Policy association to carry the deterministic path information corresponding to a Candidate Path, wherein the policy Candidate Path Flow TLV includes: Type, Length, Reserved, Flags, Traffic Class, and Flow ID.

It should be noted that a D bit in the Flags may be set to indicate that paths in all Segment Lists under the Candidate Path are disjoint paths.

That is to say, it is proposed in the embodiments of the present disclosure to extend a Policy Candidate Path Flow TLV in the SR Policy Association to carry the deterministic path information related to the Candidate Path. FIG. 8 is a diagram of the format of a Policy Candidate Path Flow TLV of a deterministic flow forwarding method according to the embodiments of the present disclosure, wherein:

Type: 16 bits, used for indicating the type of the TLV.

Length: 16 bits, used for indicating the length of the TLV.

Reserved: 16 bits, reserved.

Flags: 8 bits, used for indicating deterministic related features of the Candidate Path. The value of the D bit may be set to indicate that paths in all Segment Lists under the Candidate Path are disjoint paths, and may be selected as duplicate elimination paths in the deterministic network.

Traffic Class: 8 bits, used for indicating a traffic scheduling priority of the Candidate Path, and when steering a deterministic flow into an SR Policy, the Traffic Class may be associated according to a priority field (a DSCP in an IP header, or an TC in an MPLS header) carried in a packet header, so that a Candidate Path meeting a delay requirement may be selected.

Flow ID: 32 bits, used for uniquely identifying a deterministic flow, which enables to provide per-flow traffic scheduling in a deterministic network, for example, when a deterministic flow is aggregated, the traffic is aggregated to a flow identified by the Flow ID.

(2) A Multipath Low Latency Sub-TLV is extended in a path attributes object to carry the deterministic path information, wherein the Multipath Low Latency Sub-TLV includes: Type, Length, Reserved, Flags, Traffic Class, Flow ID, Maximum Available Low-latency Flow Number, Maximum Segment List Delay, Minimum Segment List Delay, and Maximum Segment List Delay Variation.

That is to say, it is proposed in the embodiments of the present disclosure to extend the Multipath Low Latency Sub-TLV in the Path Attributes Object to carry the deterministic path information. FIG. 9 is a diagram of the format of a Multipath Low Latency Sub-TLV of a deterministic flow forwarding method according to the embodiments of the present disclosure, wherein:

Type: 16 bits, used for indicating the type of the sub-TLV.

Length: 16 bits, used for indicating the length of the sub-TLV.

Reserved: 16 bits, reserved.

Flags: 8 bits, used for indicating features of the Segment List.

Traffic Class: 8 bits, used for indicating a traffic scheduling priority of the Segment List, and when steering a deterministic flow into an SR Policy, the Traffic Class may be associated according to a priority field (a DSCP in an IP header, or an TC in an MPLS header) carried in a packet header, so that a Segment List meeting a delay requirement may be selected.

Flow ID: 32 bits, used for uniquely identifying a deterministic flow, which enables to provide per-flow traffic scheduling in a deterministic network, for example, when separating a deterministic flow, the traffic is separated into a flow identified by the Flow ID and a path of the flow.

Maximum Available Low-latency Flow Number: 32 bits, used for indicating the maximum number of deterministic flows that can be steered when the Measurement List provides low latency assurance.

Maximum Segment List Delay: used for indicating the maximum end-to-end delay of the Segment List.

Minimum Segment List Delay: used for indicating the minimum end-to-end delay of the Segment List.

Maximum Segment List Delay Variation: used for indicating the maximum end-to-end delay jitter of the Segment List.

(3) D bit and delay information, C bit and cycle information, and Q bit and queue information are extended in an Explicit Route Object (ERO) object so as to carry deterministic path delay information and queue information, wherein the deterministic path delay information includes: Delay or Deadline; and the cycle information includes: Reserved, Cycle Profile and Cycle Number; the queue information includes: Reserved, Queuing Algorithm (Alg) Level, Queuing Alg Flag: 8 bits, and Queuing Identifier List.

That is to say, it is proposed in the embodiments of the present disclosure to extend D bit and Delay Information, C bit and Cycle Information, Q bit and Queue Information in the ERO Object to carry the information related to the deterministic path delay, the cycle sequence and the queue.

The D bit is carried in the ERO object, and when the D bit is set, it indicates that Delay Information is carried. FIG. 10 is a diagram of the format of Delay Information of a deterministic flow forwarding method according to the embodiments of the present disclosure, wherein:

Delay/Deadline: 32 bits, used for indicating a time delay or a time slot or dwell time for a node that the deterministic path passes through to process a packet.

The C bit is carried in the ERO object, and when the C bit is set, it indicates that the Cycle Information is carried. FIG. 11 is a diagram of the format of Cycle Information of a deterministic flow forwarding method according to the embodiments of the present disclosure, wherein:

Reserved: 32 bits, reserved.

Cycle Profile: 16 bits, used for indicating a profile of the cycle sequence.

Cycle Number: 32 bits, used for indicating a cycle sequence number or a time slot of a node that the deterministic path passes through.

The Q bit is carried in the ERO object, and when the Q bit is set, it indicates that the Queuing Information is carried. FIG. 12 is a diagram of the format of Queuing Information of a deterministic flow forwarding method according to the embodiments of the present disclosure, wherein:

Reserved: 16 bits, reserved.

Queuing Alg Level: 8 bits, used for indicating a queuing algorithm level for a node that a deterministic path passes through to process a packet, wherein the queuing algorithm level is used for achieving functions such as queue multi-level scheduling.

Queuing Alg Flag: 8 bits, used for indicating a queuing algorithm type for a node that the deterministic path passes through to process a packet, wherein the queuing algorithm type includes, but not limited to, queuing algorithms such as Time Aware Shaping (TAS), Credit Based Shaper (CBS), Cyclic Queuing and Forwarding (CQF), and Asynchronous Traffic Shaping (ATS).

Queuing Identifier List: having a variable length, and used for identifying a group of queues for a node that the deterministic path passes through to process a packet.

Apparently, the embodiments described above are merely some of the embodiments of the present disclosure, rather than all of the embodiments. In order to better understand the described deterministic flow forwarding method, the described process will be described below in conjunction with the embodiments, but is not used to limit the technical solution of the embodiments of the present disclosure.

In an exemplary embodiment, a method for distributing a deterministic path based on an SR Policy is provided. By extending a BGP/PCEP protocol, a controller is enabled to distribute an SR Policy of a deterministic path to a node. FIG. 13 is a second flowchart of a deterministic flow forwarding method according to the embodiments of the present disclosure. The specific operations are as follows.

In operation S1302, a controller distributes an SR Policy carrying deterministic path information to a node (equivalent to the edge node of the network in the foregoing embodiments) via an extended BGP/PCEP protocol.

In operation S1304, after receiving the SR Policy, the node forwards the packets of the deterministic flow according to the deterministic path of the SR Policy.

In an exemplary embodiment, a deterministic path SR Policy based on delay/queue scheduling is distributed via the BGP protocol. For example, FIG. 14 is a diagram of an SR Policy based deterministic network of a deterministic flow forwarding method according to the embodiments of the present disclosure. As shown in FIG. 14, a method for distributing a deterministic path based on an SR Policy is proposed in the embodiments of the present disclosure. A controller distributes an SR Policy carrying a deterministic path to an edge node H of a DetNet via a BGP protocol, and reserves a deterministic path from H to E and corresponding resources, wherein the deterministic path carries a processing delay and queue information of the node, so that the DetNet performs deterministic forwarding according to the SR Policy. The specific process is as follows.

(1) A controller distributes a BGP UPDATE message to an edge node H of the DetNet via a BGP protocol, and configures an SR Policy and a Candidate Path, wherein a Segment List is included, and the deterministic path is carried in a Segment List Sub-TLV, wherein the Low-latency Sub-TLV is used for indicating the maximum number of flows that can be steered into the path, the maximum end-to-end delay and jitter, and the minimum end-to-end delay and jitter. The end-to-end delay of the path is 10 ms~20 ms. A Delay Information sub-sub-TLV and a Queuing Information sub-sub-TLV are carried after each Segment of the Segment sub-TLV, for configuring the processing delay or time slot of the current node (for example, 1 ms), a queuing algorithm (for example, CQF algorithm), and a queue number (such as q1, q2). The pseudo codes are as follows:

```
DetNet SR policy 1 <headend = H, color = red, endpoint = E>
Candidate-path CP1 <protocol-origin = 20, originator =100:1.1.1.1, discriminator = 1>
Low-latency=10ms~20ms,
SID-List1<SIDh, Delay=1ms, Queue=CQF/q1
...
SIDe, Delay=1ms, Queue-CQF/q2>
```

(2) After receiving the configuration of the SR Policy from the controller, the DetNet node validates the current Candidate Path. After receiving the deterministic flow, the packet is forwarded according to the deterministic path.

In an exemplary embodiment, a deterministic path SR Policy based on duplicate elimination is distributed via the BGP. As shown in FIG. 14, a method for distributing a deterministic path based on an SR Policy is proposed in the embodiments of the present disclosure. A controller distributes an SR Policy carrying a deterministic path to an edge node H of a DetNet via a BGP protocol, and reserves a deterministic path from H to E and corresponding resources, wherein the deterministic path carries a duplicate path. The specific process is as follows.

(1) A controller distributes a BGP UPDATE message to an edge node of a DetNet via a BGP protocol, and configures an SR Policy and a Candidate Path of the SR Policy, wherein a Policy Candidate Path Flow Sub-TLV is carried, in which the D bit is set to 1, indicating that two contained Segment Lists are disjoint paths, which can be used for message duplicate elimination, and the deterministic path carries cycle sequence information. The pseudo codes are as follows:

```
DetNet SR policy 2 <headend = H, color =red, endpoint=E>
Candidate-path CP1<protocol-origin=20, originator=100:1.1.1.1, discriminator= 1>
Policy Candidate Path Flow (D=1)
SID-List1<SIDh, Cycle Profile=1th Profile, Cycle Number=1, ...SIDe, Cycle Profile=1th
Profile, Cycle Number=4>
SID-List2 <SIDh, Cycle Profile=2th Profile, Cycle Number=1, ...SIDe, Cycle Profile=2th
Profile, Cycle Number=5>
```

(2) After receiving the configuration of the SR Policy from the controller, the DetNet node validates the current Candidate Path. After receiving the deterministic flow, the packet is duplicated and forwarded according to the deterministic path.

In an exemplary embodiment, a deterministic path SR Policy based on priority scheduling is distributed via the PCEP. As shown in FIG. 14, a method for distributing a deterministic path based on an SR Policy is proposed in the embodiments of the present disclosure. A controller distributes an SR Policy carrying a deterministic path to an edge node H of a DetNet via a PCEP protocol, and reserves a deterministic path from H to E and corresponding resources, wherein the deterministic path carries a path priority and a processing delay and queue information of a node on the path. The DetNet performs deterministic forwarding according to the SR Policy. The specific process is as follows.

(1) A controller distributes a PCEP PCReq message to an edge node H of a DetNet via a PCEP protocol, and configures an SR Policy and a Candidate Path of the SR Policy, wherein the Candidate Path includes three sub-paths, and a Multipath Low Latency TLV is used for indicating the priority of the path, a maximum end-to-end delay, and a minimum end-to-end delay. The pseudo codes are as follows:

(1) A controller distributes a PCEP PCReq message to an edge node H of a DetNet via a PCEP protocol, and configures an SR Policy and a Candidate Path of the SR Policy, wherein the Candidate Path includes three sub-paths, and a Multipath Low Latency TLV is used for indicating a flow identifier of the path, a maximum end-to-end delay, and a minimum end-to-end delay. The pseudo codes are as follows:

```
<CP1> =
  <LSP PLSP_ID=100>
  <ASSOCIATION>
<END-POINT>
  <PATH-ATTRIB Path_ID=1
<Multipath_Low_Latency_TLV Flow ID=menber-f1, 10ms~20ms>
  <ERO SID-List1>
  <PATH-ATTRIB Path_ID=2
<Multipath_Low_Latency_TLV Flow ID=menber-f2, 21ms~30ms>>
  <ERO SID-List2>
<PATH-ATTRIB Path_ID=3
<Multipath_Low_Latency_TLV Flow ID=menber-f3, 31ms~40ms>>
  <ERO SID-List3>
```

(2) After receiving the configuration of the SR Policy from the controller, the H node of the DetNet validates the current Candidate Path. After receiving the deterministic

```
<CP1> =
  <LSP PLSP_ID=100>
  <ASSOCIATION>
<END-POINT>
  <PATH-ATTRIB Path_ID=1 <Multipath_Low_Latency_TLV Traffic Class=1, 10ms~20ms>>
    <ERO SID-List1>
  <PATH-ATTRIB Path_ID=2 <Multipath_Low_Latency_TLV Traffic Class=2, 21ms~30ms>>
    <ERO SID-List2>
<PATH-ATTRIB Path_ID=3 <Multipath_Low_Latency_TLV Traffic Class=3, 31ms~40ms>>
    <ERO SID-List3>
```

(2) After receiving the configuration of the SR Policy from the controller, the DetNet node validates the current Candidate Path. After receiving the deterministic flow, a deterministic path for forwarding a packet is selected according to a priority and a delay requirement carried in the packet.

It should be noted that this function may also be implemented based on the priority scheduling of the Candidate Path level, that is, use the composite Candidate Path to perform priority route selection.

flow, a deterministic flow is separated and forwarded according to the SR Policy in the packet.

(3) The controller distributes a PCEP PCUpd message to an edge node E of the DetNet via the PCEP protocol, and configures an SR Policy and a Candidate Path of the SR Policy, wherein the Candidate Path includes one sub-path, and a Policy Candidate Path Flow TLV is used for indicating a flow identifier of the path. The pseudo codes are as follows:

```
<CP2> =
  <LSP PLSP_ID=200>
  <ASSOCIATION <Policy Candidate Path Flow TLV, Flow ID=compound flow>>
<END-POINT>
  <PATH-ATTRIB Path_ID=1 <Multipath_Low_Latency_TLV, 10ms~40ms>>
  <ERO SID-List1>
```

In an exemplary embodiment, a deterministic path SR Policy based on aggregation and separation is distributed via the PCEP. As shown in FIG. 14, a method for distributing a deterministic path based on an SR Policy is proposed in the embodiments of the present disclosure. A controller distributes an SR Policy carrying a deterministic path to an edge node H of a DetNet via a PCEP protocol, and reserves a deterministic path from H to E and corresponding resources. The DetNet performs deterministic forwarding according to the SR Policy. The specific process is as follows.

(4) After receiving the configuration of the SR Policy from the controller, the E node of the DetNet validates the current Candidate Path. After receiving the deterministic flow, a deterministic flow is aggregated and forwarded according to the SR Policy in the packet.

In addition, a method for distributing a deterministic path based on an SR Policy by extending a BGP/PCEP protocol is provided. For example, a controller distributes an SR Policy carrying deterministic path information to an edge node of a DetNet via a BGP/PCEP protocol, thereby providing functions of resource reservation and path determination for a DetNet flow, so that the edge node of the DetNet, after receiving a packet, forwards the deterministic flow according to the deterministic path distributed by the SR Policy.

It is proposed in the embodiments of the present disclosure that an SR Policy in an extended BGP UPDATE message carries deterministic path related information, for example:

(1) A Policy Candidate Path Flow Sub-TLV is extended in SR Policy Sub-TLVs to carry deterministic path information related to the Candidate Path.

(2) A Low Latency Sub-TLV is extended in Segment List Sub-TLVs to carry deterministic path information related to the Segment List.

(3) A Delay Information sub-sub-TLV, a Cycle Information sub-sub-TLV and a Queue Information sub-sub-TLV are extended in Segment Sub-TLVs to carry the deterministic path delay, the cycle sequence and the queue information related to the Segment.

Further, it is proposed in the embodiments of the present disclosure that an SR Policy in an extended PCEP PCInit/PCUpd message carries deterministic path related information, for example:

(1) A Policy Candidate Path Flow TLV is extended in SR Policy Association to carry deterministic path information related to the Candidate Path.

(2) A Multipath Low Latency Sub-TLV is extended in the Path Attributes Object to carry the deterministic path information.

(3) D bit and Delay Information, C bit and Cycle Information, Q bit and Queue Information are extended in the ERO Object to carry the deterministic path delay, cycle sequence and queue related information.

Through the description of the foregoing embodiments, those having ordinary skill in the art may clearly understand that the method according to the foregoing embodiments may be implemented by software in addition to a necessary universal hardware platform, and definitely may also be implemented by hardware. However, in many cases, the former is a preferred implementation. Based on such understanding, the essence of the technical solutions of the embodiments of the present disclosure or the part contributing to the related art may be embodied in the form of a software product. The computer software product is stored in a storage medium (such as a Read-Only Memory (ROM)/Random Access Memory (RAM), a magnetic disk, or an optical disk), and includes several instructions for instructing a terminal device (which may be a mobile phone, a computer, a server, or a network device) to execute the methods of the embodiments of the present disclosure.

The embodiments of the present disclosure further provide a deterministic flow forwarding apparatus, which is applied to a controller. The device is used for implementing the described embodiments and exemplary implementations, and what has been described will not be elaborated. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

FIG. 15 is a structural block diagram of a deterministic flow forwarding apparatus according to the embodiments of the present disclosure, the device including:

a sending module 152, configured to send an SR Policy carrying deterministic path information to an edge node of a network, wherein the SR Policy is used for instructing the edge node of the network to forward a deterministic flow according to the deterministic path information.

By means of the described modules, a controller sends an SR Policy carrying deterministic path information to an edge node of a network, wherein the SR Policy is used for instructing the edge node of the network to forward a deterministic flow according to the deterministic path information. By virtue of the technical solution, the problem that a controller cannot implement distribution of a deterministic path by an SR Policy is solved. In addition, the controller may implement deterministic path selection of the DetNet via the SR Policy, and may steer a deterministic flow into an SR Policy forwarding path at an edge node of the DetNet.

In some exemplary embodiments, the sending module 152 is further configured to distribute the SR Policy via Path Computation Element (PCE) Communication Protocol (PCEP), wherein the controller is a Path Computation Element (PCE); and/or, the controller is configured to distribute the SR Policy via Border Gateway Protocol (BGP).

In some exemplary embodiments, the sending module 152 is further configured to distribute a BGP UPDATE message that carries the deterministic path information to the edge node of the network.

In some exemplary embodiments, the sending module 152 is further configured to extend a Policy Candidate Path Flow Sub-TLV in SR Policy Sub-TLVs to carry the deterministic path information corresponding to a Candidate Path, wherein the Policy Candidate Path Flow Sub-TLV includes: Type, Length, Flags, Traffic Class, and Flow ID.

It should be noted that a D bit in the Flags may be set to indicate that paths in all Segment Lists under the Candidate Path are disjoint paths.

In some exemplary embodiments, the sending module 152 is further configured to extend a Low Latency Sub-TLV in Segment List Sub-TLVs to carry the deterministic path information corresponding to a Segment List, wherein the Low Latency Sub-TLV includes: Type, Length, Flags, Traffic Class, Flow ID, Path ID, Maximum Available Low-latency Flow Number, Maximum Segment List Delay, Minimum Segment List Delay, and Maximum Segment List Delay Variation.

In some exemplary embodiments, the sending module 152 is further configured to extend a Delay Information sub-sub-TLV, a Cycle Information sub-sub-TLV and a Queue Information sub-sub-TLV in Segment Sub-TLVs to carry deterministic path delay information, cycle information and queue information corresponding to a segment, wherein the deterministic path delay information includes: Type, Length, Reserved, Delay or Deadline; and the cycle information includes: Type, Length, Cycle Profile and Cycle Number.

In some exemplary embodiments, the Queue Information sub-sub-TLV includes: Type, Length, Queuing Alg Level, Queuing Alg Flag: 8 bits, Queuing Identifier List.

In some exemplary embodiments, the sending module 152 is further configured to distribute a PCEP PCInit or PCUpd message that carries the deterministic path information to the edge node of the network.

In some exemplary embodiments, the sending module 152 is further configured to extend a policy Candidate Path Flow TLV in an SR Policy association to carry the deterministic path information corresponding to a Candidate Path, wherein the policy Candidate Path Flow TLV includes: Type, Length, Reserved, Flags, Traffic Class, and Flow ID.

It should be noted that a D bit in the Flags may be set to indicate that paths in all Segment Lists under the Candidate Path are disjoint paths.

In some exemplary embodiments, the sending module 152 is further configured to extend a Multipath Low Latency Sub-TLV in a path attributes object to carry the deterministic path information, wherein the Multipath Low Latency Sub-TLV includes: Type, Length, Reserved, Flags, Traffic Class, Flow ID, Maximum Available Low-latency Flow Number, Maximum Segment List Delay, Minimum Segment List Delay, and Maximum Segment List Delay Variation.

In some exemplary embodiments, the sending module 152 is further configured to extend a D bit and time delay information, a C bit and cycle information, and a Q bit and queue information in an Explicit Route Object (ERO) object so as to carry deterministic path delay information and queue information, wherein the deterministic path delay information includes: Delay or Deadline; and the cycle information includes: Reserved, Cycle Profile and Cycle Number; the queue information includes: Reserved, Queuing Algorithm (Alg) Level, Queuing Alg Flag: 8 bits, and Queuing Identifier List.

In some exemplary embodiments, the computer-readable storage medium may be configured to store a computer program for executing the following operation.

In operation S1, a controller sends an SR Policy carrying deterministic path information to an edge node of a network, wherein the SR Policy is used for instructing the edge node of the network to forward a deterministic flow according to the deterministic path information.

In an exemplary embodiment, the computer-readable storage medium may include, but is not limited to, any medium that can store a computer program, such as a Universal Serial Bus (USB) flash drive, a Read-Only Memory (ROM), a Random Access Memory (RAM), a removable hard disk, a magnetic disk, or an optical disc.

For specific examples in the embodiment, reference may be made to the examples described in the foregoing embodiments and exemplary embodiments, and details are not repeatedly described in the present embodiment.

The embodiments of the present disclosure further provide an electronic device, including a memory and a processor. The memory stores a computer program. The processor is configured to run the computer program to execute operations in any one of the method embodiments.

In some exemplary embodiments, the processor may be configured to execute the following operation when running a computer program.

In operation S1, a controller sends an SR Policy carrying deterministic path information to an edge node of a network, wherein the SR Policy is used for instructing the edge node of the network to forward a deterministic flow according to the deterministic path information.

In an exemplary embodiment, the electronic device may further include a transmission device and an input/output device, wherein the transmission device is connected to the processor, and the input/output device is connected to the processor.

For specific examples in the embodiment, reference may be made to the examples described in the foregoing embodiments and exemplary embodiments, and details are not repeatedly described in the present embodiment.

Obviously, those having ordinary skill in the art should understand that each module or each operation of the embodiments of the present disclosure can be implemented by a universal computing device, can be centralized on a single computing device or distributed on a network composed of a plurality of computing devices, and can be implemented by program codes executable by the computing devices. Thus, they can be stored in a storage apparatus and executed by the calculation apparatuses, the shown or described operations can be executed in a sequence is different from the sequence described in the embodiments under certain conditions, or they are made into integrated circuit modules respectively, or a plurality of modules or operations therein are made into a single integrated circuit module for implementation. As such, the present disclosure is not limited to any particular hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

What is claimed is:

1. A deterministic flow forwarding method, comprising:
sending, by a controller, a Segment Routing (SR) Policy carrying deterministic path information to an edge node of a network, wherein the SR Policy is used for instructing the edge node of the network to forward a deterministic flow according to the deterministic path information, and sending, by the controller, the SR Policy carrying the deterministic path information to the edge node of the network comprises at least one of: distributing, by the controller, the SR Policy via Path Computation Element (PCE) Communication Protocol (PCEP), wherein the controller is a Path Computation Element (PCE); and distributing, by the controller, the SR Policy via Border Gateway Protocol (BGP),
wherein distributing, by the controller, the SR Policy via the BGP comprises: distributing, by the controller, a BGP UPDATE message that carries the deterministic path information to the edge node of the network; and the deterministic flow forwarding method further comprises: extending a Policy Candidate Path Flow Sub-TLV in SR Policy Sub-TLVs to carry the deterministic path information corresponding to a Candidate Path, wherein the Policy Candidate Path Flow Sub-TLV comprises: Type, Length, Flags, Traffic Class, and Flow ID; and extending a Delay Information sub-sub-TLV, a Cycle Information sub-sub-TLV and a Queue Information sub-sub-TLV in Segment Sub-TLVs to carry deterministic path delay information, cycle information and queue information corresponding to a segment, wherein the deterministic path delay information comprises: Type, Length, Reserved, Delay or Deadline; and the cycle information comprises: Type, Length, Cycle Profile and Cycle Number;
or,
wherein distributing, by the controller, the SR Policy via the PCEP comprises: distributing a PCEP PCInit or PCUpd message that carries the deterministic path information to the edge node of the network; and the deterministic path information comprises: extending a D bit and time delay information, a C bit and cycle information, and a Q bit and queue information in an Explicit Route Object (ERO) object so as to carry deterministic path delay information and queue information, wherein the deterministic path delay information comprises: Delay or Deadline; and the cycle information comprises: Reserved, Cycle Profile and Cycle Number; the queue information comprises: Reserved, Queuing Algorithm (Alg) Level, Queuing Alg Flag: 8 bits, and Queuing Identifier List.

2. The deterministic flow forwarding method according to claim 1, further comprising:

setting a D bit in the Flags to indicate that paths in all Segment Lists under the Candidate Path are disjoint paths.

3. The deterministic flow forwarding method according to claim 1, further comprising:

extending a Low Latency Sub-TLV in Segment List Sub-TLVs to carry the deterministic path information corresponding to a Segment List, wherein the Low Latency Sub-TLV comprises: Type, Length, Flags, Traffic Class, Flow ID, Path ID, Maximum Available Low-latency Flow Number, Maximum Segment List Delay, Minimum Segment List Delay, and Maximum Segment List Delay Variation.

4. The deterministic flow forwarding method according to claim 1, wherein the queue information comprises: Type, Length, Queuing Algorithm (Alg) Level, Queuing Alg Flag, and Queuing Identifier List.

5. The deterministic flow forwarding method according to claim 1, further comprising:

extending a policy Candidate Path Flow TLV in an SR Policy association to carry the deterministic path information corresponding to a Candidate Path, wherein the policy Candidate Path Flow TLV comprises: Type, Length, Reserved, Flags, Traffic Class, and Flow ID.

6. The deterministic flow forwarding method according to claim 5, further comprising:

setting a D bit in the Flags to indicate that paths in all Segment Lists under the Candidate Path are disjoint paths.

7. The deterministic flow forwarding method according to claim 1, further comprising:

extending a Multipath Low Latency Sub-TLV in a path attributes object to carry the deterministic path information, wherein the Multipath Low Latency Sub-TLV comprises: Type, Length, Reserved, Flags, Traffic Class, Flow ID, Maximum Available Low-latency Flow Number, Maximum Segment List Delay, Minimum Segment List Delay, and Maximum Segment List Delay Variation.

8. A non-transitory computer-readable storage medium, wherein the non-transitory computer-readable storage medium stores a computer program, and the computer program, when running on a processor deployed in a controller, causes the processor to execute a following operation:

sending a Segment Routing (SR) Policy carrying deterministic path information to an edge node of a network, wherein the SR Policy is used for instructing the edge node of the network to forward a deterministic flow according to the deterministic path information, and sending the SR Policy carrying the deterministic path information to the edge node of the network comprises at least one of: distributing the SR Policy via Path Computation Element (PCE) Communication Protocol (PCEP), wherein the controller is a Path Computation Element (PCE); and distributing the SR Policy via Border Gateway Protocol (BGP), wherein distributing the SR Policy via the BGP comprises: distributing a BGP UPDATE message that carries the deterministic path information to the edge node of the network; and the computer program, when running on the processor deployed in the controller, causes the processor to further execute the following operations: extending a Policy Candidate Path Flow Sub-TLV in SR Policy Sub-TLVs to carry the deterministic path information corresponding to a Candidate Path, wherein the Policy Candidate Path Flow Sub-TLV comprises: Type, Length, Flags, Traffic Class, and Flow ID; and extending a Delay Information sub-sub-TLV, a Cycle Information sub-sub-TLV and a Queue Information sub-sub-TLV in Segment Sub-TLVs to carry deterministic path delay information, cycle information and queue information corresponding to a segment, wherein the deterministic path delay information comprises: Type, Length, Reserved, Delay or Deadline; and the cycle information comprises: Type, Length, Cycle Profile and Cycle Number;

or, wherein distributing the SR Policy via the PCEP comprises: distributing a PCEP PCInit or PCUpd message that carries the deterministic path information to the edge node of the network; and the deterministic path information comprises: extending a D bit and time delay information, a C bit and cycle information, and a Q bit and queue information in an Explicit Route Object (ERO) object so as to carry deterministic path delay information and queue information, wherein the deterministic path delay information comprises: Delay or Deadline; and the cycle information comprises: Reserved, Cycle Profile and Cycle Number; the queue information comprises: Reserved, Queuing Algorithm (Alg) Level Queuing Alg Flag: 8 bits, and Queuing Identifier List.

9. An electronic device, applied to a controller and comprising a memory and a processor, wherein the memory stores a computer program, and the processor is configured to run the computer program to execute a following operation:

sending a Segment Routing (SR) Policy carrying deterministic path information to an edge node of a network, wherein the SR Policy is used for instructing the edge node of the network to forward a deterministic flow according to the deterministic path information, and sending the SR Policy carrying the deterministic path information to the edge node of the network comprises at least one of: distributing the SR Policy via Path Computation Element (PCE) Communication Protocol (PCEP), wherein the controller is a Path Computation Element (PCE); and distributing the SR Policy via Border Gateway Protocol (BGP), wherein distributing the SR Policy via the BGP comprises: distributing a BGP UPDATE message that carries the deterministic path information to the edge node of the network; and the processor is configured to run the computer program to further execute the following operations: extending a Policy Candidate Path Flow Sub-TLV in SR Policy Sub-TLVs to carry the deterministic path information corresponding to a Candidate Path, wherein the Policy Candidate Path Flow Sub-TLV comprises: Type, Length, Flags, Traffic Class, and Flow ID; and extending a Delay Information sub-sub-TLV, a Cycle Information sub-sub-TLV and a Queue Information sub-sub-TLV in Segment Sub-TLVs to carry deterministic path delay information, cycle information and queue information corresponding to a segment, wherein the deterministic path delay information comprises: Type, Length, Reserved, Delay or Deadline; and the cycle information comprises: Type, Length, Cycle Profile and Cycle Number;

or, wherein distributing the SR Policy via the PCEP comprises: distributing a PCEP PCInit or PCUpd message that carries the deterministic path information to the edge node of the network; and the deterministic path information comprises: extending a D bit and time delay information, a C bit and cycle information, and a Q bit and queue information in an Explicit Route Object (ERO) object so as to carry deterministic path delay information and queue information, wherein the deterministic path delay information comprises: Delay or Deadline; and the cycle information comprises: Reserved, Cycle Profile and Cycle Number; the queue information comprises: Reserved, Queuing Algorithm (Alg) Level, Queuing Alg Flag: 8 bits, and Queuing Identifier List.

10. The electronic device according to claim 9, wherein the processor is further configured to run the computer program to execute a following operation:

extending a policy Candidate Path Flow TLV in an SR Policy association to carry the deterministic path information corresponding to a Candidate Path, wherein the policy Candidate Path Flow TLV comprises: Type, Length, Reserved, Flags, Traffic Class, and Flow ID.

\* \* \* \* \*